(12) United States Patent
Carlini et al.

(10) Patent No.: US 8,481,609 B2
(45) Date of Patent: Jul. 9, 2013

(54) PHASE CHANGE INKS CONTAINING OXAZOLINE COMPOUNDS AND POLYTERPENE RESINS

(75) Inventors: Rina Carlini, Oakville (CA); Adela Goredema, Mississauga (CA); Guerino G. Sacripante, Oakville (CA); Caroline M. Turek, Mississauga (CA); Edward G. Zwartz, Mississauga (CA)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 13/196,157

(22) Filed: Aug. 2, 2011

(65) Prior Publication Data
US 2013/0035428 A1 Feb. 7, 2013

(51) Int. Cl.
| | |
|---|---|
| *A61K 9/16* | (2006.01) |
| *B41J 2/01* | (2006.01) |
| *B41J 2/05* | (2006.01) |
| *B41J 2/17* | (2006.01) |
| *B41J 2/175* | (2006.01) |
| *B60C 1/00* | (2006.01) |
| *C08G 18/80* | (2006.01) |
| *C08G 73/10* | (2006.01) |
| *C08J 3/00* | (2006.01) |
| *C08K 5/34* | (2006.01) |
| *C08K 5/35* | (2006.01) |
| *C08K 5/48* | (2006.01) |
| *C08L 23/18* | (2006.01) |
| *C09D 5/00* | (2006.01) |
| *C09D 11/00* | (2006.01) |
| *G01D 11/00* | (2006.01) |

(52) U.S. Cl.
USPC .............. 523/160; 523/161; 524/86; 524/95; 524/104; 524/543; 524/570; 524/571; 524/579; 347/1; 347/60; 347/85; 347/95; 347/100; 347/102

(58) Field of Classification Search
USPC .............. 523/160, 161; 524/86, 95, 104, 543, 524/570, 571, 579; 347/1, 60, 85, 95, 100, 347/102
See application file for complete search history.

(56) References Cited

U.S. PATENT DOCUMENTS

| | | | |
|---|---|---|---|
| 3,235,557 A | 2/1966 | Wiggins et al. | |
| 3,308,024 A | 3/1967 | Wiggins et al. | |
| 4,153,566 A | 5/1979 | Ryer et al. | |
| 4,169,836 A | 10/1979 | Ryer et al. | |
| 5,698,017 A | 12/1997 | Sacripante et al. | |
| 5,817,169 A | 10/1998 | Sacripante et al. | |
| 2008/0306193 A1* | 12/2008 | Allen et al. | .................. 524/190 |

OTHER PUBLICATIONS

U.S. Appl. No. 13/095,636, filed Apr. 27, 2011, Belelie et al.
Rina Carlini et al., U.S. Appl. No. 13/095,174.
Rina Carlini et al., U.S. Appl. No. 13/095,221.
Kentaro Morimitsu et al., U.S. Appl. No. 13/095,795.
Paul McConville et al., U.S. Appl. No. 13/095,038.
Naveen Chopra et al., U.S. Appl. No. 13/095,555.
Jennifer L. Belelie et al., U.S. Appl. No. 13/095,591.
Kentaro Morimitsu et al., U.S. Appl. No. 13/095,784.
Kentaro Morimitsu et al., U.S. Appl. No. 13/095,715.
Kentaro Morimitsu et al., U.S. Appl. No. 13/095,770.
Jennifer L. Belelie et al., U.S. Appl. No. 13/095,681.
Thomas Edward Enright et al., U.S. Appl. No. 13/095,015.
Kentaro Morimitsu et al., U.S. Appl. No. 13/095,028.
R. H Wiley and L. L. Bennett, Chemical Reviews, vol. 44, pp. 447-476 (1949).
J. W. Cornforth, Heterocyclic Compounds, 1957, chapter 5, pp. 300-417.
A.I. Meyers and D.L. Temple, Journal of the American Chemical Society, vol. 92, p. 6644 (1970).
Garrett C. Moraski et al., European Journal of Medicinal Chemistry, 45, (2010), 1703-1716.
H. L. Wehrmeister, Journal of Organic Chemistry, vol. 27, pp. 4418-4420 (1962).
P. Allen and J. Ginos, Journal of Organic Chemistry, vol. 28, pp. 2759-2762 (1963).
Y. Chujo, K. Sada, and T. Saegusa, Macromolecules 1990, 23, 2636-2641.
Adela Goredema et al., U.S. Appl. No. 13/196,227, filed Aug. 2, 2011.
Rina Carlini et al., U.S. Appl. No. 13/196,691, filed Aug. 2, 2011.

* cited by examiner

*Primary Examiner* — Patrick Niland
(74) *Attorney, Agent, or Firm* — Judith L. Byorick

(57) ABSTRACT

Disclosed is a phase change ink comprising (a) a crystalline oxazoline compound; and (b) an amorphous polyterpene resin.

17 Claims, No Drawings

PHASE CHANGE INKS CONTAINING OXAZOLINE COMPOUNDS AND POLYTERPENE RESINS

CROSS-REFERENCE TO RELATED APPLICATIONS

Reference is made to U.S. application Ser. No. 13/095,174, filed Apr. 27, 2011, entitled "Ink Compositions Incorporating Substituted Oxazoline Compounds or Substituted Oxazoline Derivatives," with the named inventors Rina Carlini, Guerino G. Sacripante, Stephan V. Drappel, and Charles Geoffrey Allen, the disclosure of which is totally incorporated herein by reference.

Reference is made to U.S. application Ser. No. 13/095,221, filed Apr. 27, 2011, entitled "Substituted Oxazoline Compounds or Substituted Oxazoline Derivatives," with the named inventors Rina Carlini, Guerino G. Sacripante, Stephan V. Drappel, and Bo Wu, the disclosure of which is totally incorporated herein by reference.

Reference is made to U.S. application Ser. No. 13/095,795, filed Apr. 27, 2011, entitled "Solid Ink Compositions Comprising Amorphous Esters of Citric Acid," with the named inventors Kentaro Morimitsu, Jennifer L. Belelie, Stephan V. Drappel, C. Geoffrey Allen, Corey Tracy, and Peter G. Odell, the disclosure of which is totally incorporated herein by reference.

Reference is made to U.S. application Ser. No. 13/095,038, filed Apr. 27, 2011, entitled "Print Process for Phase Separation Ink," with the named inventors Paul McConville, Joanne L. Lee, Peter G. Odell, and Sandra J. Gardner, the disclosure of which is totally incorporated herein by reference.

Reference is made to U.S. application Ser. No. 13/095,555, filed Apr. 27, 2011, entitled "Phase Change Inks and Methods of Making the Same," with the named inventors Naveen Chopra, Jennifer L. Belelie, Kentaro Morimitsu, Stephan V. Drappel, Corey Tracy, and Peter G. Odell, the disclosure of which is totally incorporated herein by reference.

Reference is made to U.S. application Ser. No. 13/095,591, filed Apr. 27, 2011, entitled "Phase Change Ink Components and Methods of Making the Same," with the named inventors Jennifer L. Belelie, Kentaro Morimitsu, Naveen Chopra, Corey Tracy, Stephan V. Drappel, and Peter G. Odell, the disclosure of which is totally incorporated herein by reference.

Reference is made to U.S. application Ser. No. 13/095,784, filed Apr. 27, 2011, entitled "Solid Ink Compositions Comprising Amorphous Esters of Tartaric Acid," with the named inventors Kentaro Morimitsu, Jennifer L. Belelie, Naveen Chopra, Stephan V. Drappel, Corey Tracy, and Peter G. Odell, the disclosure of which is totally incorporated herein by reference.

Reference is made to U.S. application Ser. No. 13/095,715, filed Apr. 27, 2011, entitled "Solid Ink Compositions Comprising Crystalline Esters of Tartaric Acid," with the named inventors Kentaro Morimitsu, Jennifer L. Belelie, Naveen Chopra, Stephan V. Drappel, Corey Tracy, and Peter G. Odell, the disclosure of which is totally incorporated herein by reference.

Reference is made to U.S. application Ser. No. 13/095,770, filed Apr. 27, 2011, entitled "Phase Change Inks and Methods of Making the Same," with the named inventors Kentaro Morimitsu, Jennifer L. Belelie, Naveen Chopra, Stephan V. Drappel, Corey Tracy, and Peter G. Odell, the disclosure of which is totally incorporated herein by reference.

Reference is made to U.S. application Ser. No. 13/095,681, filed Apr. 27, 2011, entitled "Solid Ink Compositions Comprising Crystalline-Amorphous Mixtures," with the named inventors Jennifer L. Belelie, Peter G. Odell, Stephan V. Drappel, Kentaro Morimitsu, Naveen Chopra, Corey Tracy, Jule W. Thomas Jr., Jeffrey H. Banning, Paul J. McConville, and Joanne L. Lee, the disclosure of which is totally incorporated herein by reference.

Reference is made to U.S. application Ser. No. 13/095,015, filed Apr. 27, 2011, entitled "Solventless Reaction Process," with the named inventors Thomas Edward Enright, Pouneh Salehi, and Kentaro Morimitsu, the disclosure of which is totally incorporated herein by reference.

Reference is made to U.S. application Ser. No. 13/095,028, filed Apr. 27, 2011, entitled "Phase Change Ink," with the named inventors Kentaro Morimitsu, Jennifer L. Belelie, Naveen Chopra, Stephan V. Drappel, Corey L. Tracy, and Peter G. Odell, the disclosure of which is totally incorporated herein by reference.

Reference is made to U.S. application Ser. No. 13/196,227, filed concurrently herewith, entitled "Phase Change Inks Containing Crystalline Trans-Cinnamic Diesters and Amorphous Isosorbide Oligomers," with the named inventors Adela Goredema, Rina Carlini, Caroline M. Turek, Guerino G. Sacripante, and Edward G. Zwartz, the disclosure of which is totally incorporated herein by reference.

Reference is made to U.S. application Ser. No. 13/196,691, filed concurrently herewith, entitled "Solid Phase Change Ink Compositions Comprising Oxazolines," with the named inventors Rina Carlini, Adela Goredema, Guerino G. Sacripante, Caroline M. Turek, and Edward G. Zwartz, the disclosure of which is totally incorporated herein by reference.

BACKGROUND

Disclosed herein are phase change ink compositions. More specifically, disclosed herein are phase change inks containing crystalline oxazoline compounds and amorphous polyterpene resins.

In general, phase change inks (sometimes referred to as "hot melt inks") are in the solid phase at ambient temperature, but exist in the liquid phase at the elevated operating temperature of an ink jet printing device. At the jet operating temperature, droplets of liquid ink are ejected from the printing device and, when the ink droplets contact the surface of the recording substrate, either directly or via an intermediate heated transfer belt or drum, they quickly solidify to form a predetermined pattern of solidified ink drops. Phase change inks have also been used in other printing technologies, such as gravure printing, as disclosed in, for example, U.S. Pat. No. 5,496,879 and German Patent Publications DE 4205636AL and DE 4205713AL, the disclosures of each of which are totally incorporated herein by reference.

Phase change inks are desirable for ink jet printers because they remain in a solid phase at room temperature during shipping, long term storage, and the like. In addition, the problems associated with nozzle clogging as a result of ink evaporation with liquid ink jet inks are largely eliminated, thereby improving the reliability of the ink jet printing. Further, in phase change ink jet printers wherein the ink droplets are applied directly onto the final recording substrate (for example, paper, transparency material, and the like), the droplets solidify immediately upon contact with the substrate, so that migration of ink along the printing medium is prevented and dot quality is improved.

Known phase change inks generally contain components such as crystalline waxes and other materials that enable sharp and rapid phase transitions from the molten liquid state to the solid state. Many known phase change inks, however, exhibit disadvantages such as poor adhesion to paper substrates, including coated and uncoated paper substrates, poor scratch-resistance, poor image robustness, hard and brittle properties, poor 'paper fold' performance such as cracking and creasing of the image when the document is folded, and document offset. Further, the nonpolarity of these ink components often leads to compatibility issues with commonly available commercial dyes and pigments, resulting in the need for custom-designed colorants to ensure good solubility or dispersibility in the ink carrier and good long-term thermal stability to prevent colorant degradation or colorant migration.

Customers have also created a demand for materials that are bio-based, or derived at least partly from renewable resources. Energy and environmental policies, increasing and volatile oil prices, and public/political awareness of the rapid depletion of global fossil reserves has created a need to find sustainable materials and chemicals derived from bio-based monomers or polymers. By using bio-renewable feedstocks, such as those derived from agricultural crops or the forestry industry, manufacturers can reduce their carbon footprint and move to a carbon-neutral footprint. Bio-based polymers are also very attractive in terms of specific energy and emission savings. Using bio-based feedstock can decrease the amount of plastic targeted for landfills, help provide new sources of income for domestic agriculture, and reduce the economic risks and uncertainty associated with reliance on petroleum imported from unstable regions.

Oxazolines are a promising class of heterocyclic compounds which have been previously reported for medical, pharmaceutical, and veterinary uses, and also as additives in personal care and consumer product formulations, such as shampoos, detergents, and the like, and in oleaginous compositions such as mechanical lubricating oils and as oil and sludge dispersants. Oxazolines can be prepared efficiently in one or more reaction steps from simple starting materials, which are typically an organic carboxylic acid and a primary amino alcohol. Detailed reviews of the chemistry of oxazoles and oxazoline compounds are known, as illustrated by R. H Wiley and L. L. Bennett in *Chemical Reviews*, Vol. 44, pp. 447-476 (1949), and also extensively described by J. W. Cornforth in *Heterocyclic Compounds,* 1957, chapter 5, pp. 300-417, the disclosures of each of which are totally incorporated herein by reference. Furthermore, oxazoline derivatives being the major product from the reaction of an organic acid and amino alcohol is also known, such as disclosed by A. I. Meyers and D. L. Temple in *Journal of the American Chemical Society*, Vol. 92, p. 6644 (1970), the disclosure of which is totally incorporated herein by reference. Further, in *European Journal of Medicinal Chemistry,* 45, (2010), 1703-1716, the disclosure of which is totally incorporated herein by reference, Garrett C. Moraski et al. describe low toxicity anti-tuberculosis agents derived from o-hydroxy phenyl-oxazoline and o-hydroxy phenyl-oxazole benzyl esters.

While known materials and processes are suitable for their intended purposes, there is a need for improved phase change inks. In addition, there is a need for phase change inks that exhibit sharp and rapid phase transitions from the molten liquid state to the solid state. Further, there is a need for phase change inks that exhibit good adhesion to paper substrates, including coated and uncoated paper substrates. Additionally, there is a need for phase change inks that exhibit good scratch-resistance. A need also remains for phase change inks that exhibit good image robustness. In addition, a need remains for phase change inks that exhibit good 'paper fold' performance and reduced cracking and creasing of the image when the document is folded. Further, a need remains for phase change inks that exhibit document offset performance. Additionally, a need remains for phase change inks that exhibit good compatibility with commonly available colorants. In addition, there is a need for phase change inks that are suitable for ink jet printing under a variety of conditions, such as direct-to-paper (DTP) printing conditions. Further, there is a need for phase change ink compositions that are compatible with a wide variety of papers that generate high quality images on a wide variety of papers at low cost. Additionally, there is a need for phase change inks that contain at least some materials at least partly derived from bio-based or renewable resources. A need also remains for phase change inks that can be prepared at desirably low cost.

SUMMARY

Disclosed herein is a phase change ink comprising: (a) a crystalline oxazoline compound; and (b) an amorphous polyterpene resin. Also disclosed herein is a phase change ink comprising: (1) an ink carrier comprising: (a) a crystalline oxazoline compound in an amount of from about 20 to about 80 percent by weight of the ink carrier; (b) an amorphous polyterpene resin in an amount of from about 7 to about 40 percent by weight of the ink carrier; and (c) a viscosity modifier; and (2) a colorant. Further disclosed herein is a phase change ink comprising: (1) an ink carrier comprising: (a) a crystalline oxazoline compound of the formula

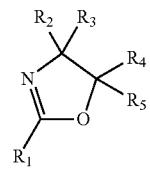

wherein: $R_1$ is: (i) an alkyl group, including substituted and unsubstituted alkyl groups, wherein hetero atoms either may or may not be present in the alkyl group; (ii) an aryl group, including substituted and unsubstituted aryl groups, wherein hetero atoms either may or may not be present in the aryl group; (iii) an arylalkyl group, including substituted and unsubstituted arylalkyl groups, wherein hetero atoms either may or may not be present in either or both of the alkyl portion and the aryl portion of the arylalkyl group; or (iv) an alkylaryl group, including substituted and unsubstituted alkylaryl groups, wherein hetero atoms either may or may not be present in either or both of the alkyl portion and the aryl portion of the alkylaryl group; and $R_2$, $R_3$, $R_4$, and $R_5$ each, independently of the other, are: (i) hydrogen atoms; (ii) halogen atoms; (iii) alkyl groups, including substituted and unsubstituted alkyl groups, wherein hetero atoms either may or may not be present in the alkyl group; (iv) aryl groups, including substituted and unsubstituted aryl groups, wherein hetero atoms either may or may not be present in the aryl group; (v) arylalkyl groups, including substituted and unsubstituted arylalkyl groups, wherein hetero atoms either may or may not be present in either or both of the alkyl portion and the aryl portion of the arylalkyl group; or (vi) alkylaryl groups, including substituted and unsubstituted alkylaryl groups, wherein hetero atoms either may or may not be present in either or both of the alkyl portion and the aryl portion of the alkylaryl group; (b) an amorphous polyterpene resin containing monomers selected from alpha-pinene, beta-pinene, limonene, norbornene, myrcene, phellandrene, carvone, camphene, 2-carene, 3-carene, perillyl alcohol, perillyl aldehyde, perillic acid, alkyl esters of perillyl alcohol, aryl esters of perillyl alcohol, arylalkyl esters of perillyl alcohol, alkylaryl esters of perillyl alcohol, α-ionone, β-ionone, γ-terpinene, β-citronellene, β-citronellol, citronellal, citronellic acid, alkyl esters of β-citronellol, aryl esters of β-citronellol, arylalkyl esters of β-citronellol, alkylaryl esters of β-citronellol, geraniol, geranial, alkyl esters of geraniol, aryl esters of geraniol, arylalkyl esters of geraniol, alkylaryl esters of geraniol, linalool, alkyl esters of linalool, aryl esters of linalool, arylalkyl esters of linalool, alkylaryl esters of linalool, nerolidol, alkyl esters of nerolidol, aryl esters of nerolidol, arylalkyl esters of nerolidol, alkylaryl esters of nerolidol, verbenone, verbenol, alkyl esters of verbenol, aryl esters of verbenol, arylalkyl esters of verbenol, alkylaryl esters of verbenol, and mixtures thereof; and (c) a viscosity modifier selected from a sorbitan tristearate ester, pentaerythritol tetrastearate, pentaerythritol tetrabenzoate, or mixtures thereof; and (2) a colorant.

DETAILED DESCRIPTION

Ink Components

The inks disclosed herein contain a crystalline component which comprises at least one or more oxazoline compounds. Examples of suitable oxazoline compounds include (but are not limited to) those of the formula

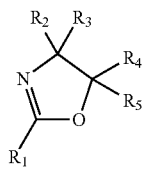

wherein:

$R_1$ is (1) an alkyl group, including linear, branched, saturated, unsaturated, cyclic, substituted, and unsubstituted alkyl groups, and wherein hetero atoms, such as oxygen, nitrogen, sulfur, silicon, phosphorus, and the like either may or may not be present in the alkyl group, in one embodiment with at least about 1 carbon atom, and in another embodiment with at least about 5 carbon atoms, and in one embodiment with no more than about 60 carbon atoms, in another embodiment with no more than about 36 carbon atoms, and in yet another embodiment with no more than about 25 carbon atoms, although the number of carbon atoms can be outside of these ranges, (2) an aryl group, including substituted and unsubstituted aryl groups, and wherein hetero atoms, such as oxygen, nitrogen, sulfur, silicon, phosphorus, and the like either may or may not be present in the aryl group, in one embodiment with at least about 5 carbon atoms, and in another embodiment with at least about 6 carbon atoms, and in one embodiment with no more than about 24 carbon atoms, in another embodiment with no more than about 18 carbon atoms, and in yet another embodiment with no more than about 14 carbon atoms, although the number of carbon atoms can be outside of these ranges, such as phenyl or the like, (3) an arylalkyl group, including substituted and unsubstituted arylalkyl groups, wherein the alkyl portion of the arylalkyl group can be linear, branched, saturated, unsaturated, and/or cyclic, and wherein hetero atoms, such as oxygen, nitrogen, sulfur, silicon, phosphorus, and the like either may or may not be present in either or both of the alkyl portion and the aryl portion of the arylalkyl group, in one embodiment with at least about 6 carbon atoms, and in another embodiment with at least about 7 carbon atoms, and in one embodiment with no more than about 36 carbon atoms, in another embodiment with no more than about 24 carbon atoms, and in yet another embodiment with no more than about 18 carbon atoms, although the number of carbon atoms can be outside of these ranges, such as benzyl or the like, or (4) an alkylaryl group, including substituted and unsubstituted alkylaryl groups, wherein the alkyl portion of the alkylaryl group can be linear, branched, saturated, unsaturated, and/or cyclic, and wherein hetero atoms, such as oxygen, nitrogen, sulfur, silicon, phosphorus, and the like either may or may not be present in either or both of the alkyl portion and the aryl portion of the alkylaryl group, in one embodiment with at least about 6 carbon atoms, and in another embodiment with at least about 7 carbon atoms, and in one embodiment with no more than about 36 carbon atoms, in another embodiment with no more than about 24 carbon atoms, and in yet another embodiment with no more than about 18 carbon atoms, although the number of carbon atoms can be outside of these ranges, such as tolyl or the like; and $R_2$, $R_3$, $R_4$, and $R_5$ each, independently of the other, are (1) hydrogen atoms, (2) halogen atoms, such as fluorine, chlorine, bromine, or iodine, (3) alkyl groups, including linear, branched, saturated, unsaturated, cyclic, substituted, and unsubstituted alkyl groups, and wherein hetero atoms, such as oxygen, nitrogen, sulfur, silicon, phosphorus, and the like either may or may not be present in the alkyl group, in one embodiment with at least about 1 carbon atoms, in another embodiment with at least about 2 carbon atoms, and in yet another embodiment with at least about 3 carbon atoms, and in one embodiment with no more than about 36 carbon atoms, and in another embodiment with no more than about 30 carbon atoms, although the number of carbon atoms can be outside of these ranges, (4) aryl groups, including substituted and unsubstituted aryl groups, and wherein hetero atoms, such as oxygen, nitrogen, sulfur, silicon, phosphorus, and the like either may or may not be present in the aryl group, in one embodiment with at least about 5 carbon atoms, and in another embodiment with at least about 6 carbon atoms, and in one embodiment with no more than about 24 carbon atoms, and in another embodiment with no more than about 18 carbon atoms, although the number of carbon atoms can be outside of these ranges, such as phenyl or the like, (5) arylalkyl groups, including substituted and unsubstituted arylalkyl groups, wherein the alkyl portion of the arylalkyl group can be linear, branched, saturated, unsaturated, and/or cyclic, and wherein hetero atoms, such as oxygen, nitrogen, sulfur, silicon, phosphorus, and the like either may or may not be present in either or both of the alkyl portion and the aryl portion of the arylalkyl group, in one embodiment with at least about 6 carbon atoms, and in another embodiment with at least about 7 carbon atoms, and in one embodiment with no more than about 36 carbon atoms, and in another embodiment with no more than about 24 carbon atoms, although the number of carbon atoms can be outside of these ranges, such as benzyl or the like, or (6) alkylaryl groups, including substituted and unsubstituted alkylaryl groups, wherein the alkyl portion of the alkylaryl group can be linear, branched, saturated, unsaturated, and/or cyclic, and wherein hetero atoms, such as oxygen, nitrogen, sulfur, silicon, phosphorus, and the like either may or may not be present in either or both of the alkyl portion and the aryl portion of the alkylaryl group, in one embodiment with at least about 6 carbon atoms, and in another embodiment with at least about 7 carbon atoms, and in one embodiment with no more than about 36 carbon atoms, and in another embodiment with no more than about 24 carbon atoms, although the number of carbon atoms can be outside of these ranges, such as tolyl or the like, wherein the substituents on the substituted alkyl, aryl, arylalkyl, and alkylaryl groups for $R_1$, $R_2$, $R_3$, $R_4$, and $R_5$ can be (but are not limited to) hydroxy groups, halogen atoms, amine groups, imine groups, ammonium groups, cyano groups, pyridine groups, pyridinium groups, ether groups, aldehyde groups, ketone groups, ester groups, amide groups, carbonyl groups, thiocarbonyl groups, sulfate groups, sulfonate groups, sulfonic acid groups, sulfide groups, sulfoxide groups, phosphine groups, phosphonium groups, phosphate groups, nitrile groups, mercapto groups, nitro groups, nitroso groups, sulfone groups, acyl groups, acid anhydride groups, azide groups, cyanato groups, isocyanato groups, thiocyanato groups, isothiocyanato groups, carboxylate groups, carboxylic acid groups, urethane groups, urea groups, mixtures thereof, and the like, wherein two or more substituents can be joined together to form a ring.

In one specific embodiment, $R_1$ is an alkyl group, such as a linear unsubstituted aliphatic group. In another specific embodiment, $R_1$ is an alkylaryl group, such as a group of the formula

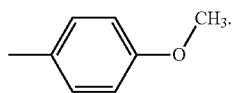

In one specific embodiment, $R_2$, $R_3$, $R_4$, and $R_5$ each, independently of the others, are unsubstituted alkyl groups, or hydroxyalkyl groups, such as those of the formula $-(CH_2)_nOH$ wherein n is an integer of in one embodiment at least about 1, and in another embodiment at least about 2, and in one embodiment no more than about 12, and in another embodiment no more than about 10, although the value of n can be outside of these ranges, or alkyl ester groups, such as those of the formula $-(CH_2)_p-OOC(CH_2)_m-CH_3$ wherein p is an integer of in one embodiment at least about 1, and in another embodiment at least about 2, and in one embodiment no more than about 12, and in another embodiment no more than about 10, although the value of p can be outside of these ranges, and m is an integer of in one embodiment at least about 1, and in another embodiment at least about 2, and in one embodiment no more than about 36, and in another embodiment no more than about 24, although the value of m can be outside of these ranges.

In one specific embodiment, the oxazoline is of the formula

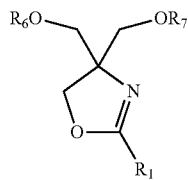

wherein $R_1$ is as defined hereinabove and wherein $R_6$ and $R_7$ each, independently of the other, is (1) a hydrogen atom, or (2) a group of the formula

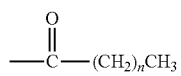

wherein n is 0 or an integer of from 1 to about 36.

Specific examples of suitable oxazoline compounds, all of which are crystalline at room temperature, include (but are not limited to) (melting and crystallization temperatures measured by differential scanning calorimetry at a scan rate of 10° per minute):

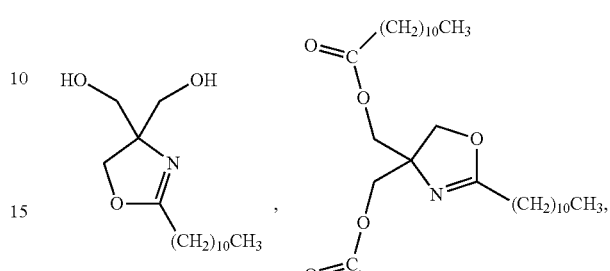

$T_{melt} = 97°$ C.; $T_{cryst} = 73°$ C.

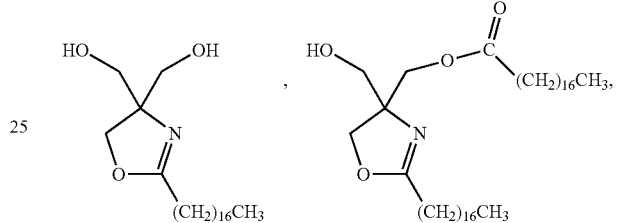

$T_{melt} = 98°$ C.; $T_{cryst} = 72.4°$ C.     $T_{melt} = 60°$ C.; $T_{cryst} = 45°$ C.

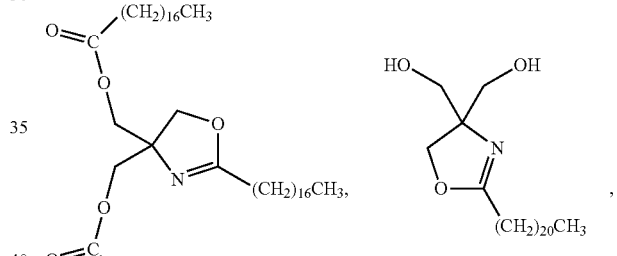

$T_{melt} = 56°$ C.; $T_{cryst} = 33°$ C.     $T_{melt} = 108.6°$ C.; $T_{cryst} = 92°$ C.

and the like, as well as mixtures thereof.

In one specific embodiment, the oxazoline is selected to be derived from a bio-based or renewable resource. Products can be tested for whether they are sourced from petroleum or from renewable resources by $^{14}C$ radiocarbon dating. Products sourced from petroleum will have substantially high $^{14}C$ radiocarbon dating values, in the millions of years, compared to very recent or present day radiocarbon values for those products derived from renewable resources. Examples of suitable bio-based oxazolines include, but are not limited to,

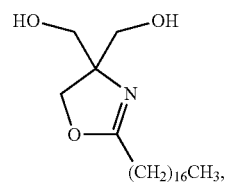

derived from the reaction of stearic acid, commercially available as a cheap, 'green' bio-renewable feedstock chemical, and tris(hydroxymethyl)aminomethane, erucic acid, oleic acid, linoleic acid, palmitic acid, lauric acid, and the like, as well as mixtures thereof.

Oxazolines can be prepared by any desired or effective method, such as by a condensation reaction at elevated temperatures between an acid having an $R_1$ group with at least 1 molar equivalent of an amino alcohol. Oxazolines can also be prepared as described in, for example, U.S. Pat. Nos. 5,817,169 and 5,698,017 and in R. H Wiley and L. L. Bennett, Chemical Reviews, Vol. 44, pp. 447-476 (1949), J. W. Cornforth, *Heterocyclic Compounds,* 1957, chapter 5, pp. 300-417, and A. I. Meyers and D. L. Temple, *Journal of the American Chemical Society, Vol.* 92, p. 6644 (1970), the disclosures of each of which are totally incorporated herein by reference.

The substituted oxazoline compounds of the formula

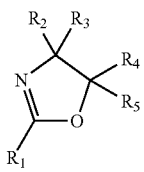

can be prepared in one embodiment by a condensation reaction occurring at a suitable temperature, such as from about 120° C. to about 220° C., of an acid having an $R_1$ group as defined hereinabove with at least 1 molar equivalent of a suitable amino alcohol per mole of acid. The condensation reaction between the acid and the amino alcohol can be performed at reduced pressure, such as less than about 100 mmHg. The condensation reaction can be carried out with or without the use of a catalyst; catalysts can be used to expedite completion of the reaction. Suitable catalysts include tetraalkyl titanates, dialkyltin oxides such as dibutyltin oxide (dibutyl oxostannane), tetraalkyltin oxide compounds such as dibutyltin dilaurate, dialkylstannoic acid compounds such as butylstannoic acid, aluminum alkoxides, alkyl zinc, dialkyl zinc, zinc oxide, stannous oxide, or mixtures thereof; and which catalysts are selected in amounts of, for example, from about 0.005 mole percent to about 5 mole percent based on the starting diacid. In some embodiments, the condensation reaction is complete (i.e., at least about 95% of the diacid has been reacted) in less than about 15 hours.

In a specific embodiment, the crystalline oxazoline compounds disclosed herein have sufficiently low viscosities in the molten state that render them highly suitable for use as crystalline phase change agents in solid inks for ink jet printing. In these embodiments, the crystalline oxazoline compounds, such as the specific compounds illustrated hereinabove, can have complex viscosities when measured at temperatures above about 110° C., of in one embodiment at least about 1 cPs (centipoise, or mPa-sec), in another embodiment at least about 2 cPs, and in yet another embodiment at least about 3 cPs, and in one embodiment no more than about 20 cPs, in another embodiment no more than about 15 cPs, and in yet another embodiment no more than about 13 cPs, although the complex viscosity can be outside of these ranges. At room temperature, the complex viscosity of the crystalline oxazoline compounds disclosed herein can be ≧ about $1 \times 10^5$ cPs.

The crystalline oxazoline compound is present in the ink in any desired or effective amount, in one embodiment at least about 10 percent by weight of the ink, in another embodiment at least about 20 percent by weight of the ink, and in yet another embodiment at least about 25 percent by weight of the ink, and in one embodiment no more than about 90 percent by weight of the ink, in another embodiment no more than about 80 percent by weight of the ink, and in yet another embodiment no more than about 75 percent by weight of the ink, although the amount can be outside of these ranges.

The inks disclosed herein also contain an amorphous polyterpene resin. Polyterpene resins are those obtained by polymerization of unsaturated monoterpene compounds, such as alpha-pinene, beta-pinene, d-limonene, and the like, as well as mixtures thereof, all of which are derived from renewable resources.

Monoterpene compounds are 10-carbon compounds belonging to the terpenoid family of natural products, which are biosynthesized naturally in plant and animal sources from two types of 5-carbon building block compounds, isopentenyl pyrophosphate (IPP) and dimethylallyl pyrophosphate (DMAPP). The biosynthetic pathway which produces the monoterpene compounds (also known as the mevalonic acid pathway) involves the 'head-to-tail' cationic addition of IPP with DMAPP, which is catalyzed enzymatically with involvement of adenosine triphosphate (ATP) equilibria. The product formed in the addition of IPP with DMAPP is geranyl pyrophosphate (GPP), which can go on to add further IPP and DMAPP building units, thereby producing larger terpenoid compounds, including the sesquiterpenes (C15 compounds), the diterpenes (C20 compounds, such as for example the rosin family of abietic acid derivatives), sesterterpenes (C25 compounds), and the well-known triterpene (C30 compounds, which include squalene, cholesterol, progesterone, and other sterols and steroid compounds). Alternatively, the C10 building block GPP (geranyl pyrophosphate) can undergo intramolecular cyclization to provide functional and fragrant monoterpene compounds that include mono-unsaturated pinenes (alpha, beta isomers), limonene, camphenes, and bornenes.

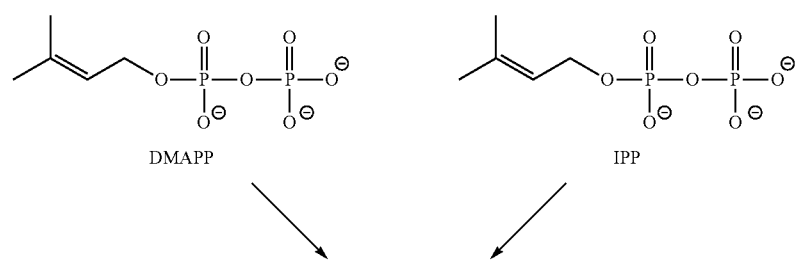

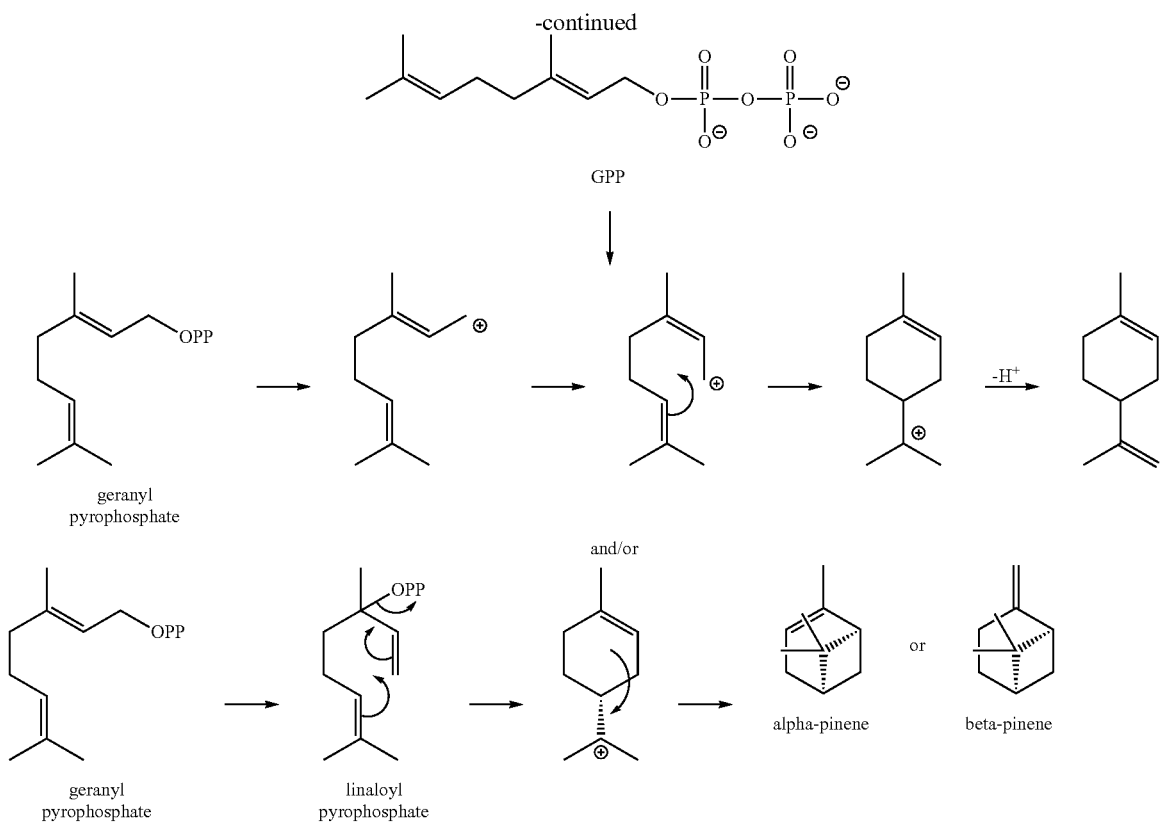

GPP geranyl pyrophosphate geranyl pyrophosphate linaloyl pyrophosphate and/or alpha-pinene   beta-pinene Oxidation of these unsaturated compounds leads to well-known fragrant monoterpenes such as menthol, geraniol, eucaplyptol, perilla alcohol, and camphor. Details about the biosynthesis and properties of the terpenoid family of natural products are fully described in, for example, P. M. Dewick, *Medicinal Natural Products: A Biosynthetic Approach* (2002, Wiley), the disclosure of which is totally incorporated herein by reference.

In specific embodiments, the polyterpene resins can be either homopolymers or copolymers of unsaturated monoterpenes, such as alpha-pinene, beta-pinene, d-limonene, mixtures of alpha/beta-pinenes and the like, and blended combinations thereof. In other specific embodiments, the polyterpene resins can also be copolymers of unsaturated monoterpenes such as alpha-pinene, beta-pinene, d-limonene, and the like, with other ethylenically unsaturated conventional monomers that are petroleum-based, such as styrene, alpha-methylstyrene, alkyl acrylates, alkyl methacryates, vinyl alkanoates such as vinyl acetate, vinyl butyrate and the like, ethylene vinyl acetate, styrene-maleic anhydride, and similar monomers.

Examples of suitable polyterpene resins include (but are not limited to) homopolymers and copolymers of α-pinene, β-pinene, limonene, norbornene, myrcene, phellandrene, carvone, camphene, 2-carene, 3-carene, perillyl alcohol, perillyl aldehyde, perillic acid, alkyl, aryl, arylalkyl, and alkylaryl esters of perillyl alcohol or perillyl acid, α-ionone, β-ionone, γ-terpinene, β-citronellene, β-citronellol, citronellal, citronellic acid, alkyl, aryl, arylalkyl, and alkylaryl esters of β-citronellol or citronellic acid, geraniol, geranial, alkyl, aryl, arylalkyl, and alkylaryl esters of geraniol, such as geranyl benzoate and the like, linalool, alkyl, aryl, arylalkyl, and alkylaryl esters of linalool, nerolidol, alkyl, aryl, arylalkyl, and alkylaryl esters of nerolidol, such as nerolidyl acetate and the like, verbenol, verbenone, alkyl, aryl, arylalkyl, and alkylaryl esters of verbenol, and blended mixtures of the homopolymers or copolymers. The alkyl, aryl, arylalkyl, and alkylaryl esters include those wherein alkyl includes linear, branched, saturated, unsaturated, cyclic, substituted, and unsubstituted alkyl groups, and wherein hetero atoms, such as oxygen, nitrogen, sulfur, silicon, phosphorus, and the like either may or may not be present in the alkyl group, in one embodiment with at least about 1 carbon atom, and in another embodiment with at least about 2 carbon atoms, and in one embodiment with no more than about 20 carbon atoms, and in another embodiment with no more than about 18 carbon atoms, although the number of carbon atoms can be outside of these ranges; aryl includes substituted and unsubstituted aryl groups, and wherein hetero atoms, such as oxygen, nitrogen, sulfur, silicon, phosphorus, and the like either may or may not be present in the aryl group, in one embodiment with at least about 5 carbon atoms, and in another embodiment with at least about 6 carbon atoms, and in one embodiment with no more than about 24 carbon atoms, in another embodiment with no more than about 18 carbon atoms, and in yet another embodiment with no more than about 14 carbon atoms, although the number of carbon atoms can be outside of these ranges, such as phenyl or the like; arylalkyl includes substituted and unsubstituted arylalkyl groups, wherein the alkyl portion of the arylalkyl group can be linear, branched, saturated, unsaturated, and/or cyclic, and wherein hetero atoms, such as oxygen, nitrogen, sulfur, silicon, phosphorus, and the like either may or may not be present in either or both of the alkyl portion and the aryl portion of the arylalkyl group, in one embodiment with at least about 6 carbon atoms, and in another embodiment with at least about 7 carbon atoms, and in one embodiment with no more than about 36 carbon atoms, in another embodiment with no more than about 24 carbon atoms, and in yet another embodiment with no more than about 18 carbon atoms, although the number of carbon atoms can be outside of these ranges, such as benzyl or the like; alkylaryl includes substituted and unsubstituted alkylaryl groups, wherein the alkyl portion of the alkylaryl group can be linear, branched, saturated, unsaturated, and/or cyclic, and wherein hetero atoms, such as oxygen, nitrogen, sulfur, silicon, phosphorus, and the like either may or may not be present in either or both of the alkyl portion and the aryl portion of the alkylaryl group, in one embodiment with at least about 6 carbon atoms, and in another embodiment with at least about 7 carbon atoms, and in one embodiment with no more than about 36 carbon atoms, in another embodiment with no more than about 24 carbon atoms, and in yet another embodiment with no more than about 18 carbon atoms, although the number of carbon atoms can be outside of these ranges, such as tolyl or the like; and wherein the substituents on the substituted alkyl, aryl, arylalkyl, and alkylaryl groups can be (but are not limited to) hydroxy groups, halogen atoms, amine groups, imine groups, ammonium groups, cyano groups, pyridine groups, pyridinium groups, ether groups, aldehyde groups, ketone groups, ester groups, amide groups, carbonyl groups, thiocarbonyl groups, sulfate groups, sulfonate groups, sulfonic acid groups, sulfide groups, sulfoxide groups, phosphine groups, phosphonium groups, phosphate groups, nitrile groups, mercapto groups, nitro groups, nitroso groups, sulfone groups, acyl groups, acid anhydride groups, azide groups, cyanato groups, isocyanato groups, thiocyanato groups, isothiocyanato groups, carboxylate groups, carboxylic acid groups, urethane groups, urea groups, mixtures thereof, and the like, wherein two or more substituents can be joined together to form a ring. Other examples of suitable polyterpene compounds include copolymers of unsaturated monoterpenes with conventional petroleum-based ethylenically unsaturated monomers, such as for example, styrene, alpha-methylstyrene, alkyl acrylates (with alkyl as defined in this paragraph), alkyl methacryates (with alkyl as defined in this paragraph), vinyl alkanoates (with alkyl as defined in this paragraph), such as vinyl acetate, vinyl butyrate and the like, ethylene vinyl acetate, styrene-maleic anhydride, and similar monomers.

The polyterpene resins for the inks disclosed herein are commonly random copolymers, but can also include block copolymers or grafted copolymers prepared by methods suitable for either block copolymer synthesis or for chemically grafting other copolymer segments. In a specific embodiment, the polyterpene resin is a random copolymer prepared from a mixture of α-pinene, β-pinene, β-phellandrene, and other ethylenically unsaturated monomers such as dipentene or isoprene or limonene. In the polyterpene resins of embodiments prepared from mixtures of α-pinene and β-pinene monomers, the molar ratio of α- to β-pinene monomer can range from about 5% to about 80% of the total pinene monomer mixture. In further embodiments, the amount of total α/β-pinene monomers used to prepare the polyterpene resins can be in the range of from about 50 mole-% to about 100 mole-% of total monomers used, although the amount can also be outside of this range.

The weighted-average molecular weight (Mw) of the polyterpene resins can be of any suitable amount that is useful for a particular ink formulation. In specific embodiments, the value is such as to provide an ink composition that has good jetting viscosity at higher temperature of about 9 to 12 centipoise (cPs). In one specific embodiment, the Mw value for the polyterpene resins (determined by gel-permeation chromatography methods and measured against polystyrene calibration standards) is at least about 2,000, in another embodiment at least about 5,000, and in yet another embodiment at least about 7,000, and in one embodiment no more than about 50,000, in another embodiment no more than about 30,000, and in yet another embodiment no more than about 20,000, although the value can be outside of these ranges.

The polyterpene resins suitable for the inks disclosed herein are amorphous materials. In specific embodiments, the polyterpene resins have a pale color and have values less than about 5 on the Gardner scale when measured as a 50 wt % solution in organic solvent by colorimetry (tintometer instrument). The polyterpene resins have glass transition onset temperatures (Tg) in one embodiment of at least about 10° C., and one embodiment of no more than about 60° C., although the value can be outside of this range, and endpoint Tg values of in one embodiment of at least about 20° C., and in one embodiment of no more than about 75° C., although the value can be outside of this range. Furthermore, the polyterpene resins have softening points (measured by the ring and ball method) of in one embodiment at least about 30° C., in another embodiment at least about 40° C., and in yet another embodiment at least about 50° C., and in one embodiment no more than about 130° C., in another embodiment no more than about 125° C., and in yet another embodiment no more than about 120° C., although the value can be outside of these ranges.

In one specific embodiment, some polyterpene resins can exhibit rheological properties of amorphous polymers as illustrated in the table below. The PICCOLYTE® polyterpene resin examples shown exhibit complex viscosities measured at 1 Hz frequency and at temperatures above 130° C. that range from about 200 cPs to about 20,000 cPs. At temperatures lower than about 100° C., the complex viscosities measured at 1 Hz for these resins were significantly higher and ranging from about $1\times10^5$ cPs to about $5\times10^9$ cPs. In addition, the polyterpene resins exhibited "Newtonian" rheological behavior, in that the complex viscosity measured at temperatures above 130° C. did not change significantly under different applied shear frequencies (ranging from about 0.1 Hz to about 16 Hz). These viscosity properties were found to be suitable for use as amorphous binder resins in phase change ink formulations when combined with a crystalline phase-change agent or viscosity-modifying component.

Rheology profiles of three suitable commercially available polyterpene resins were measured using the Rheometrics RFS3 strain-controlled rheometer and the results are shown in the table below. Complex viscosity was measured across a dynamic temperature sweep of 140° C. to about 75° C. using a Rheometrics RFS3 instrument equipped with 25 mm parallel plate geometry tool, set at constant frequency of 1 Hz and under constant 100% applied strain.

| | Complex Viscosity (cPs)* | | |
|---|---|---|---|
| Temperature (° C.) | Piccolyte® F105 | Piccolyte® F90 | Piccolyte® S-85 |
| 140 | 6878 | 1374 | 466 |
| 135 | 12081 | 2250 | 656 |
| 130 | 22160 | 3844 | 971 |
| 125 | 42335 | 6895 | 1492 |
| 120 | 86630 | 12966 | 2353 |
| 115 | 186236 | 26242 | 3904 |
| 110 | 436821 | 55129 | 6849 |
| 105 | 1096000 | 129719 | 12755 |
| 100 | 3023294 | 320089 | 24320 |

-continued

| Temperature (° C.) | Complex Viscosity (cPs)* | | |
|---|---|---|---|
| | Piccolyte® F105 | Piccolyte® F90 | Piccolyte® S-85 |
| 95 | 7979134 | 813184 | 50656 |
| 90 | — | 2228871 | 112470 |
| 85 | — | 5768318 | 255240 |
| 80 | — | — | 643621 |
| 75 | — | — | 1575535 |

— indicates not measured

Examples of suitable amorphous polyterpene resins include the commercial PICCOLYTE® series of resins available from Pinova Solutions (USA), such as PICCOLYTE® S25 and S85 (β-pinene resin prepared from β-pinene), PICCOLYTE® F90 and F105 (α-pinene/β-pinene copolymer resin prepared from α-pinene/(β-pinene monomer mixtures), and PICCOLYTE® C105 (limonene resin prepared from limonene monomers). Other suitable polyterpene resins include the SYLVAGUM™ TR 90 and TR 105 resins, and SYLVARES™ ZT106 resins available from Arizona Chemical (USA).

Polyterpenes are particularly desirable ink components because they have good thermal stability and elastomeric properties suitable for phase change printing inks, and because they are obtained from bio-based or renewable sources.

The amorphous polyterpene resin is present in the ink composition in a total amount in any desired or effective amount, in one embodiment at least about 5 percent by weight of the ink, in another embodiment at least about 7 percent by weight of the ink, and in yet another embodiment at least about 10 percent by weight of the ink, and in one embodiment no more than about 50 percent by weight of the ink, in another embodiment no more than about 40 percent by weight of the ink, and in yet another embodiment no more than about 35 percent by weight of the ink, although the amount can be outside of these ranges.

Colorants

The ink compositions can also contain an optional colorant Any desired or effective colorant can be employed in the ink compositions, including dyes, pigments, mixtures thereof, and the like. Any dye or pigment can be chosen, provided that it is capable of being dispersed or dissolved in the ink carrier and is compatible with the other ink components. The ink compositions can be used in combination with conventional ink colorant materials, such as Color Index (C.I.) Solvent Dyes, Disperse Dyes, modified Acid and Direct Dyes, Basic Dyes, Sulphur Dyes, Vat Dyes, and the like. Examples of suitable dyes include Neozapon Red 492 (BASF); Orasol Red G (BASF); Direct Brilliant Pink B (Oriental Giant Dyes); Direct Red 3BL (Classic Dyestuffs); Supranol Brilliant Red 3BW (Bayer AG); Lemon Yellow 6G (United Chemie); Light Fast Yellow 3G (Shaanxi); Aizen Spilon Yellow C-GNH (Hodogaya Chemical); Bernachrome Yellow GD Sub (Classic Dyestuffs); Cartasol Brilliant Yellow 4GF (Clariant); Cibanon Yellow 2GN (BASF); Orasol Black CN (BASF); Savinyl Black RLSN (Clariant); Pyrazol Black BG (Clariant); Morfast Black 101 (Rohm & Haas); Diazol Black RN (ICI); Orasol Blue GN (BASF); Savinyl Blue GLS (Clariant); Luxol Fast Blue MBSN (Pylam Products); Sevron Blue 5GMF (Classic Dyestuffs); Basacid Blue 750 (BASF); Neozapon Black X51 (BASF), Classic Solvent Black 7 (Classic Dyestuffs), Sudan Blue 670 (C.I. 61554) (BASF), Sudan Yellow 146 (C.I. 12700) (BASF), Sudan Red 462 (C.I. 26050) (BASF), C.I. Disperse Yellow 238, Neptune Red Base NB543 (BASF, C.I. Solvent Red 49), Neopen Blue FF-4012 from BASF, Lampronol Black BR from ICI (C.I. Solvent Black 35), Morton Morplas Magenta 36 (C.I. Solvent Red 172), metal phthalocyanine colorants such as those disclosed in U.S. Pat. No. 6,221,137, the disclosure of which is totally incorporated herein by reference, and the like. Other suitable dyes include those disclosed in U.S. Patent Application Publication No. 2010/0086683 and U.S. Pat. Nos. 7,732,581; 7,381,831; 6,713,614; 6,646,111; 6,590,082; 6,472,523; 6,713,614; 6,958,406; 6,998,493; 7,211,131; and 7,294,730, the disclosures of each of which are totally incorporated herein by reference. Polymeric dyes can also be used, such as those disclosed in, for example, U.S. Pat. Nos. 5,621,022 and 5,231,135, the disclosures of each of which are totally incorporated herein by reference, and commercially available from, for example, Milliken & Company as Milliken Ink Yellow 869, Milliken Ink Blue 92, Milliken Ink Red 357, Milliken Ink Yellow 1800, Milliken Ink Black 8915-67, uncut Reactant Orange X-38, uncut Reactant Blue X-17, Solvent Yellow 162, Acid Red 52, Solvent Blue 44, and uncut Reactant Violet X-80.

In some embodiments, solvent dyes are employed. Examples of suitable solvent dyes include Neozapon Red 492 (BASF); Orasol Red G (BASF); Direct Brilliant Pink B (Global Colors); Aizen Spilon Red C-BH (Hodogaya Chemical); Kayanol Red 3BL (Nippon Kayaku); Spirit Fast Yellow 3G; Aizen Spilon Yellow C-GNH (Hodogaya Chemical); Cartasol Brilliant Yellow 4GF (Clariant); Pergasol Yellow CGP (BASF); Orasol Black RLP (BASF); Savinyl Black RLS (Clariant); Morfast Black Conc. A (Rohm and Haas); Orasol Blue GN (BASF); Savinyl Blue GLS (Sandoz); Luxol Fast Blue MBSN (Pylam); Sevron Blue 5GMF (Classic Dyestuffs); Basacid Blue 750 (BASF), Neozapon Black X51 [C.I. Solvent Black, C.I. 12195] (BASF), Sudan Blue 670 [C.I. 61554] (BASF), Sudan Yellow 146 [C.I. 12700] (BASF), Sudan Red 462 [C.I. 260501] (BASF), and the like.

Pigments are also suitable colorants for the inks described herein. Examples of suitable pigments include PALIOGEN Violet 5100 (BASF); PALIOGEN Violet 5890 (BASF); HELIOGEN Green L8730 (BASF); LITHOL Scarlet D3700 (BASF); SUNFAST Blue 15:4 (Sun Chemical); Hostaperm Blue B2G-D (Clariant); Hostaperm Blue B4G (Clariant); Permanent Red P-F7RK; Hostaperm Violet BL (Clariant); LITHOL Scarlet 4440 (BASF); Bon Red C (Dominion Color Company); ORACET Pink RF (BASF); PALIOGEN Red 3871 K (BASF); SUNFAST Blue 15:3 (Sun Chemical); PALIOGEN Red 3340 (BASF); SUNFAST Carbazole Violet 23 (Sun Chemical); LITHOL Fast Scarlet L4300 (BASF); SUNBRITE Yellow 17 (Sun Chemical); HELIOGEN Blue L6900, L7020 (BASF); SUNBRITE Yellow 74 (Sun Chemical); SPECTRA PAC C Orange 16 (Sun Chemical); HELIOGEN Blue K6902, K6910 (BASF); SUNFAST Magenta 122 (Sun Chemical); HELIOGEN Blue D6840, D7080 (BASF); Sudan Blue OS (BASF); NEOPEN Blue FF4012 (BASF); PV Fast Blue B2GO1 (Clariant); IRGALITE Blue BCA (BASF); PALIOGEN Blue 6470 (BASF); Sudan Orange G (Aldrich), Sudan Orange 220 (BASF); PALIOGEN Orange 3040 (BASF); PALIOGEN Yellow 152, 1560 (BASF); LITHOL Fast Yellow 0991 K (BASF); PALIOTOL Yellow 1840 (BASF); NOVOPERM Yellow FGL (Clariant); Ink Jet Yellow 4G VP2532 (Clariant); Toner Yellow HG (Clariant); Lumogen Yellow D0790 (BASF); Suco-Yellow L1250 (BASF); Suco-Yellow D1355 (BASF); Suco Fast Yellow DI 355, DI 351 (BASF); HOSTAPERM Pink E 02 (Clariant); Hansa Brilliant Yellow 5GX03 (Clariant); Permanent Yellow GRL 02 (Clariant); Permanent Rubine L6B 05 (Clariant);

FANAL Pink D4830 (BASF); CINQUASIA Magenta (Du Pont); PALIOGEN Black L0084 (BASF); Pigment Black K801 (BASF); and carbon blacks such as REGAL 330™ (Cabot), Nipex 150 (Degussa) Carbon Black 5250 and Carbon Black 5750 (Columbia Chemical), and the like. Other suitable pigments include those disclosed in U.S. Pat. Nos. 7,905,954; 7,503,973; 7,465,348; and 7,427,323, the disclosures of each of which are totally incorporated herein by reference.

Mixtures of two or more dyes, two or more pigments, and one or more dyes with one or more pigments can also be used.

The ink can also contain one or more dispersants and/or one or more surfactants for their known properties, such as for controlling wetting properties of the pigments in the ink composition. Examples of suitable additives include, but are not limited to, BYK-UV 3500, BYK-UV 3510 (BYK-Chemie); Dow Corning 18, 27, 57, 67 Additives; ZONYL FSO 100 (DuPont); MODAFLOW 2100 (Solutia); Foam Blast 20F, 30, 550 (Lubrizol); EFKA-1101, -4046, -4047, -2025, -2035, -2040, -2021, -3600, -3232; SOLSPERSE 13000, 13240, 17000, 19200, 20000, 34750, 36000, 39000, 41000, 54000, individual dispersants or combinations may optionally be used with synergists including SOLSPERSE 5000, 12000, 22000 (Lubrizol); DISPERBYK-108, -163, -167, 182 (BYK-Chemie); K-SPERSE 132, XD-A503, XD-A505 (King Industries). When present, the optional additives may each, or in combination, be present in the ink in any desired or effective amount, in one embodiment at least about 0.1 percent by weight of the ink, and in another embodiment at least about 0.5 percent by weight of the ink, and in one embodiment no more than about 15 percent by weight of the ink, and in another embodiment no more than about 12 percent by weight of the ink, although the amount can be outside of these ranges.

The colorant is present in any desired or effective amount to obtain the desired color or hue, in one embodiment at least about 0.5 percent by weight of the ink, in another embodiment at least about 1 percent by weight of the ink, and in yet another embodiment at least about 2 percent by weight of the ink, and in one embodiment no more than about 30 percent by weight of the ink, in another embodiment no more than about 20 percent by weight of the ink, in yet another embodiment no more than about 15 percent by weight of the ink, in still another embodiment no more than about 12 percent by weight of the ink, and in yet another embodiment no more than about 10 percent by weight of the ink, although the amount can be outside of these ranges.

Additional Ink Additives

Additional optional components can be contained in the ink, such as viscosity modifiers, which are suitably low-melting and preferably crystalline compounds that have low melt viscosities so as to enable the phase change ink to have a low viscosity for inkjet printing. Crystalline viscosity modifiers can have melting temperatures of in one embodiment at least about 40° C., in another embodiment at least about 50° C., and in yet another embodiment at least about 55° C., and in one embodiment no more than about 100° C., in another embodiment no more than about 95° C., and in yet another embodiment no more than about 90° C., although the temperature can be outside of these ranges. The melt viscosities of suitable viscosity modifiers for use in the inks disclosed herein are in one embodiment at least about 3 cPs, in another embodiment at least about 4 cPs, and in yet another embodiment at least about 5 cPs, and in one embodiment no more than about 12 cPs, in another embodiment no more than about 10 cPs, and in yet another embodiment no more than about 9.5 cPs, although the value can be outside of these ranges.

Examples of suitable viscosity modifiers for the phase change ink include, but are not limited to, pentaerythritol esters, such as pentaerythritol tetrastearate, pentaerythritol tetrabenzoate, and the like, sorbitol esters, including sorbitan tristearate esters and the like, such as SPAN 65, SPAN 60, SPAN 85, SPAN 40, and the like, available from Sigma-Aldrich Fine Chemicals Inc., Milwaukee, Wis., stearyl stearamide (also known as KEMAMIDE S180 available from Chemtura Corp., USA), erucamide, stearone, sucrose tetrastearate, linear alkyl cinnamate esters, and the like, as well as mixtures thereof, in the ink composition in amounts of in one embodiment at least about 0.5 percent by weight, in another embodiment at least about 1 percent by weight, and in yet another embodiment at least about 2 percent by weight, and in one embodiment no more than about 15 percent by weight, in another embodiment no more than about 12 percent by weight, and in yet another embodiment no more than about 10 percent by weight, although the amount can be outside of these ranges.

In some embodiments, the ink can optionally contain antioxidants to protect the images from oxidation and also to protect the ink components from oxidation while existing as a heated melt in the ink reservoir. Examples of suitable antioxidants include (1) N,N'-hexamethylene bis(3,5-di-tert-butyl-4-hydroxy hydrocinnamamide) (IRGANOX 1098, available from Ciba Inc.), (2) 2,2-bis(4-(2-(3,5-di-tert-butyl-4-hydroxyhydrocinnamoyloxy))ethoxyphenyl)propane (TOPANOL-205, available from ICI America Corporation), (3) tris(4-tert-butyl-3-hydroxy-2,6-dimethyl benzyl)isocyanurate (CYANOX 1790, 41,322-4, LTDP, Aldrich D12, 840-6), (4) 2,2'-ethylidene bis(4,6-di-tert-butylphenyl)fluoro phosphonite (ETHANOX-398, available from Ethyl Corporation), (5) tetrakis(2,4-di-tert-butylphenyl)-4,4'-biphenyl diphosphonite (Aldrich 46, 852-5), (6) pentaerythritol tetrastearate (TCI America #P0739), (7) tributylammonium hypophosphite (Aldrich 42, 009-3), (8) 2,6-di-tert-butyl-4-methoxyphenol (Aldrich 25, 106-2), (9) 2,4-di-tert-butyl-6-(4-methoxybenzyl)phenol (Aldrich 23, 008-1), (10) 4-bromo-2,6-dimethylphenol (Aldrich 34, 951-8), (11) 4-bromo-3,5-didimethylphenol (Aldrich B6, 420-2), (12) 4-bromo-2-nitrophenol (Aldrich 30, 987-7), (13) 4-(diethylaminomethyl)-2,5-dimethylphenol (Aldrich 14, 668-4), (14) 3-dimethylaminophenol (Aldrich D14, 400-2), (15) 2-amino-4-tert-amylphenol (Aldrich 41, 258-9), (16) 2,6-bis(hydroxymethyl)-p-cresol (Aldrich 22, 752-8), (17) 2,2'-methylenediphenol (Aldrich B4, 680-8), (18) 5-(diethylamino)-2-nitrosophenol (Aldrich 26, 951-4), (19) 2,6-dichloro-4-fluorophenol (Aldrich 28, 435-1), (20) 2,6-dibromo fluoro phenol (Aldrich 26, 003-7), (21) α,α,α-trifluoro-o-cresol (Aldrich 21, 979-7), (22) 2-bromo-4-fluorophenol (Aldrich 30, 246-5), (23) 4-fluorophenol (Aldrich F1, 320-7), (24) 4-chlorophenyl-2-chloro-1,1,2-tri-fluoroethyl sulfone (Aldrich 13, 823-1), (25) 3,4-difluoro phenylacetic acid (Aldrich 29, 043-2), (26) 3-fluorophenylacetic acid (Aldrich 24, 804-5), (27) 3,5-difluoro phenylacetic acid (Aldrich 29, 044-0), (28) 2-fluorophenylacetic acid (Aldrich 20, 894-9), (29) 2,5-bis(trifluoromethyl) benzoic acid (Aldrich 32, 527-9), (30) ethyl-2-(4-(4-(trifluoromethyl)phenoxy)phenoxy)propionate (Aldrich 25, 074-0), (31) tetrakis (2,4-di-tert-butyl phenyl)-4,4'-biphenyl diphosphonite (Aldrich 46, 852-5), (32) 4-tert-amyl phenol (Aldrich 15, 384-2), (33) 3-(2H-benzotriazol-2-yl)-4-hydroxy phenethylalcohol (Aldrich 43, 071-4), NAUGARD 76, NAUGARD 445, NAUGARD 512, and NAUGARD 524 (manufactured by Chemtura Corporation), and the like, as well as mixtures thereof. The antioxidant, when present, can be present in the ink in any desired or effective amount, in one embodiment at least about 0.25 percent by weight of the ink, and in another embodiment at least about 1 percent by weight of the ink, and in one embodiment no more than about 10 percent by weight of the ink, and in another embodiment no more than about 5 percent by weight of the ink, although the amount can be outside of these ranges.

The ink can further contain an optional tackifier in addition to the polyterpene resins, such as the commercial derivatives of rosin acids derived from gum rosins or tall oil resins. Representative examples include, but are not limited to, a glycerol ester of hydrogenated abietic (rosin) acid such as FORAL 85 (commercially available from Eastman), a pentaerythritol ester of hydroabietic (rosin) acid such as FORAL 105 (commercially available from Eastman), CELLOLYN 21, a hydroabietic (rosin) alcohol ester of phthalic acid (commercially available from Eastman), triglycerides of hydrogenated abietic (rosin) acid such as KE-311 and KE-100 resins, (commercially available from Arakawa Chemical Industries, Ltd.), synthetic polyterpene resins such as NEVTAC 2300, NEVTAC 100, and NEVTACO 80 (commercially available from Neville Chemical Company), WINGTACK 86, a modified synthetic polyterpene resin (commercially available from Sartomer), and the like, as well as mixtures thereof. Tackifiers can be present in the ink in any desired or effective amount, in one embodiment at least about 0.01 percent by weight of the ink, in another embodiment at least about 0.1 percent by weight of the ink, and in yet another embodiment at least about 0.5 percent by weight of the ink, and in one embodiment no more than about 20 percent by weight of the ink, in another embodiment no more than about 17 percent by weight of the ink, and in yet another embodiment no more than about 15 weight percent of the ink, although the amount can be outside of these ranges.

The term "ink carrier", as used herein, refers to those components of the ink other than the colorant or mixture of colorants.

By careful selection of the sources of the ink carrier contents sources, the ink carrier can have a high bio-renewable content (BRC). In one embodiment, the ink carrier (defined as that portion of the ink other than the colorant and other minor additives such as antioxidants and the like) has a BRC of at least 10%, in another embodiment at least 12%, and in yet another embodiment at least about 15%, although the amount can be outside of these ranges.

In one specific embodiment, the phase change ink disclosed herein is a non-wax based ink containing little or no major component comprising wax-based compounds. By "major" is meant 10 percent or more by weight of the total ink composition.

Ink Preparation

The ink compositions can be prepared by any desired or suitable method. For example, each of the components of the ink carrier can be mixed together, followed by heating the mixture to at least its melting point. The colorant may be added before the ink ingredients have been heated or after the ink ingredients have been heated. The molten mixture may optionally be subjected to grinding in an attritor, ball mill or media mill apparatus, or to high shear mixing, in order to effect dispersion of the colorant in the ink carrier. The heated mixture is then stirred to obtain a uniform molten ink, followed by cooling the ink to ambient temperature. The inks are solid at ambient temperature.

Ink Properties

The melting and crystallization temperatures of the phase change ink compositions can be determined by differential scanning calorimetry (DSC), with, for example, a TA Instruments Q100 apparatus, using a heating and cooling temperature gradient of 10° C. per minute and measuring the crystallization temperature after a second repeat cycle of heating and cooling (to remove thermal history of the sample). The melting and crystallization temperatures of the phase change ink compositions can also be determined by dynamic rheology (with, for example, a Rheometrics RFS3 strain-controlled rheometer, using a 25 mm parallel plate geometry tool), with a gradient of 5° C. temperature steps every 90 seconds, while cooling the ink sample from an initial high temperature, such as about 140° C., to about 40° C., under a constant oscillating frequency of about 1 Hz and applied strain of about 100%.

The ink compositions in one embodiment have peak melting points, as measured by DSC methods, of no lower than about 60° C., in another embodiment no lower than about 70° C., in yet another embodiment no lower than about 75° C., and in still another embodiment no lower than about 80° C., and have melting points in one embodiment no higher than about 120° C., in another embodiment no higher than about 115° C., and in yet another embodiment no higher than about 110° C., although the peak melting point can be outside of these ranges.

The ink compositions in one embodiment have onset crystallization temperatures, as measured by the dynamic rheology method, of no lower than about 50° C., in another embodiment of no lower than about 55° C., and in yet another embodiment of no lower than about 60° C., and have onset crystallization temperatures in one embodiment of no higher than about 110° C., in another embodiment of no higher than about 105° C., and in yet another embodiment of no higher than about 100° C., although the onset crystallization temperature can be outside of these ranges.

The ink compositions generally have melt viscosities at a suitable jetting temperature (in one embodiment no lower than about 90° C., in another embodiment no lower than about 95° C., and in yet another embodiment no lower than about 100° C., and in one embodiment no higher than about 150° C., and in another embodiment no higher than about 140° C., although the jetting temperature can be outside of these ranges) in one embodiment of no more than about 20 centipoise, in another embodiment of no more than about 18 centipoise, and in yet another embodiment of no more than about 15 centipoise, and in one embodiment of no less than about 5 centipoise, in another embodiment of no less than about 7 centipoise, and in yet another embodiment of no less than about 9 centipoise, although the melt viscosity can be outside of these ranges. In another specific embodiment, the inks have viscosities of from about 7 to about 15 centipoise at temperatures of about 110, 120, and/or 130° C.

The phase change ink compositions generally have peak viscosities at the end of their crystallization (solidification) phase transition (in one embodiment no lower than about 40° C., in another embodiment no lower than about 50° C., and in yet another embodiment no lower than about 60° C., and in one embodiment no higher than about 120° C., and in another embodiment no higher than about 110° C., although the solidification endpoint temperature can be outside of these ranges) in one embodiment of no more than about $1 \times 10^9$ centipoise, and in another embodiment of no more than about $1 \times 10^8$ centipoise, and in one embodiment of no less than about $1 \times 10^7$ centipoise, and in another embodiment of no less than about $1 \times 10^6$ centipoise, although the peak viscosity value can be outside of these ranges. The table below shows the rheological profiles of complex viscosity versus temperature that were measured for four phase change colored inks, measured with a Rheometrics RFS3 instrument, using a 25 mm parallel plate geometry tool, constant frequency of 1 Hz, and applied strain of 100%, over a temperature range of 140°

C. to about 60° C., which include three representative examples of inks as disclosed herein and one comparative phase change ink example commercialized by Xerox for the PHASER® series of solid inkjet printers.

| | | | Complex Viscosity (cPs)* | | | | |
|---|---|---|---|---|---|---|---|
| °C. | Ink 1 | °C. | Ink 2 | °C. | Ink 3 | °C. | Comparative Ink |
| 130 | 12.0 | 130 | 12.1 | 130 | 14.8 | 120 | 9.2 |
| 125 | 15.5 | 125 | 15.2 | 125 | 18.8 | 115 | 10.5 |
| 120 | 18.8 | 120 | 18.5 | 120 | 22.4 | 110 | 11.6 |
| 115 | 22.6 | 115 | 20.8 | 115 | 26.6 | 105 | 13.3 |
| 110 | 27.2 | 110 | 25.7 | 110 | 31.5 | 100 | 15.2 |
| 105 | 33.7 | 105 | 30.4 | 109 | 32.6 | 95 | 17.4 |
| 100 | 40.3 | 100 | 37.5 | 108 | 33.8 | 90 | 21.0 |
| 95 | 50.6 | 95 | 46.7 | 107 | 35.6 | 88 | 33.5 |
| 94 | 52.4 | 94 | 48.5 | 106 | 37.5 | 86 | 9803 |
| 93 | 54.2 | 93 | 50.8 | 105 | 43.7 | 84 | 565411 |
| 92 | 58.0 | 92 | 54.9 | 104 | 210 | 82 | 1543284 |
| 91 | 140 | 91 | 360 | 103 | 8180812 | 80 | 4389535 |
| 90 | 158603 | 90 | 541645 | 102 | 18816626 | — | — |
| 89 | 3482727 | 89 | 5981662 | 101 | 15257774 | — | — |
| 88 | 6986715 | 88 | 11025862 | 100 | 18600274 | — | — |
| 87 | 16758068 | 87 | 20899340 | 99 | 23870210 | — | — |
| 86 | 31409622 | 86 | 26011280 | 99 | 31743154 | — | — |
| 85 | 44773164 | 85 | 35086176 | 97 | 37039292 | — | — |
| 84 | 57422944 | 84 | 50028808 | 96 | 41040872 | — | — |

— indicates not measured

The hardness of the phase change ink is a characteristic that can serve as an indicator of ink robustness on the printed image (for example, resistance to abrasion, folding creases, and the like). The ink hardness can be measured using a needle penetrometer apparatus, such as the PTC® Durometer Model PS 6400-0-29001 (available from Pacific Transducer Corp., USA) equipped with a Model 476 Stand with standard 1 Kg load. In this Durometer apparatus, a sharp tip (or needle) mounted within a retractable post is pressed against the surface of a molded sample of ink. The degree of resistance to the needle tip upon pushing down on the ink surface is measured and correlated to the distance by which the needle tip has retracted backward into the mounting post. A measured value of 100 would indicate a perfectly hard and impermeable surface (such as glass).

The inks disclosed herein have hardness values, measured at about 25° C. using the PTC® Durometer, of in one embodiment at least about 60, in another embodiment at least about 65, in yet another embodiment at least about 70, in still another embodiment at least about 75, and in yet still another embodiment at least about 80, although the value can be outside of these ranges.

Printing Processes

The inks can be employed in an apparatus for ink jet printing processes either directly to paper, or indirectly to an intermediate transfer member. Examples of apparatus that are suitable for printing the inks described herein include apparatus comprising at least one thermally controlled ink retaining reservoir to store or hold molten phase-change ink, an ink jet head for printing the ink, and an ink supply line for providing the phase-change ink to the ink jet head.

Another embodiment disclosed herein is directed to a process which comprises incorporating an ink as disclosed herein into an ink jet printing apparatus, melting the ink, and causing droplets of the melted ink to be ejected in an imagewise pattern onto a recording substrate. Known direct printing process may be suitable for applying the ink compositions of the present disclosure onto a substrate.

Yet another embodiment disclosed herein is directed to a process which comprises incorporating an ink as disclosed herein into an ink jet printing apparatus, melting the ink, causing droplets of the melted ink to be ejected in an imagewise pattern onto an intermediate transfer member, and transferring the ink in the imagewise pattern from the intermediate transfer member to a final recording substrate. In a specific embodiment, the intermediate transfer member is heated to a temperature above that of the final recording sheet and below that of the melted ink in the printing apparatus. In another specific embodiment, both the intermediate transfer member and the final recording sheet are heated; in this embodiment, both the intermediate transfer member and the final recording sheet are heated to a temperature below that of the melted ink in the printing apparatus; in this embodiment, the relative temperatures of the intermediate transfer member and the final recording sheet can be (1) the intermediate transfer member is heated to a temperature above that of the final recording substrate and below that of the melted ink in the printing apparatus; (2) the final recording substrate is heated to a temperature above that of the intermediate transfer member and below that of the melted ink in the printing apparatus; or (3) the intermediate transfer member and the final recording sheet are heated to approximately the same temperature. An offset or indirect printing process is also disclosed in, for example, U.S. Pat. No. 5,389,958, the disclosure of which is totally incorporated herein by reference. In one specific embodiment, the printing apparatus employs a piezoelectric printing process wherein droplets of the ink are caused to be ejected in imagewise pattern by oscillations of piezoelectric vibrating elements. Inks as disclosed herein can also be employed in other hot melt printing processes, such as hot melt acoustic ink jet printing, hot melt thermal ink jet printing, hot melt continuous stream or deflection ink jet printing, and the like. Phase-change inks as disclosed herein can also be used in printing processes other than hot melt ink jet printing processes, such as hot-melt lithographic, flexographic, and related offset ink printing processes.

Any suitable substrate or recording sheet can be employed, such as plain paper, including XEROX® 4024 papers, XEROX® Image Series papers, Courtland 4024 DP paper, ruled notebook paper, bond paper, coated papers such as Sharp Company silica coated paper, Xerox® Digital Color Elite Gloss paper, JuJo paper, HAMMERMILL LASER-PRINT® paper, heavy paper stocks and the like, and transparency materials, fabrics, textile products, plastics, flexible polymeric films, inorganic substrates such as metals or silicon wafers, wood, and the like.

Specific embodiments will now be described in detail. These examples are intended to be illustrative, and the claims are not limited to the materials, conditions, or process parameters set forth in these embodiments. All parts and percentages are by weight unless otherwise indicated.

EXAMPLE I

Synthesis of
2-undecyl-5,5-bis(hydroxymethyl)-4H-oxazoline

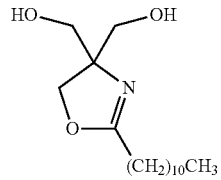

To a 1 Liter Parr reactor equipped with a double turbine agitator and distillation apparatus, was charged in order: dodecanoic acid (200 g; Sigma-Aldrich, Milwaukee, Wis.), tris(hydroxymethyl)aminomethane (92 g; EMD Chemicals, NJ), and butylstannoic acid catalyst (FASCAT 4100; 0.45 grams; Arkema Inc). The contents were heated to 165° C. for a 2 h period, followed by increasing the temperature to 205° C. over a 2 h period, during which time the water distillate was collected in a distillation receiver. The reactor pressure was then reduced to about 1-2 mm-Hg for 1 h, followed by discharging into a tared container and cooling to room temperature. The product was purified by dissolving with mild heating in a mixture of ethyl acetate (2.5 parts) and hexane (10 parts), and then cooling to room temperature to crystallize the pure product as a white granular powder. The peak melting point (by DSC) was determined to be 97° C.

Rheological analysis of this material was measured over a temperature range starting at 130° C. and cooling down to 40° C., using a RFS3 Rheometrics instrument (oscillation frequency of 1 Hz, 25 mm parallel plate geometry, 200 applied strain %). The melt viscosity at 130° C. was 8.2 cPs, and the onset of crystallization of this material occurred at 97° C., with a peak viscosity of $4.5 \times 10^6$ cPs.

EXAMPLE II

Synthesis of
2-heptadecyl-5,5-bis(hydroxymethyl)-4H-oxazoline

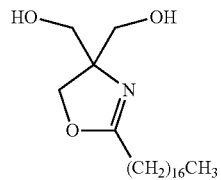

A 1 L Parr reactor equipped with an agitator, distillation apparatus, and bottom drain valve was charged with stearic acid (426 g, obtained from Sigma-Aldrich), tris(hydroxymethyl)aminomethane (181.5 g), and 0.75 g butylstannoic acid (FASCAT 4100). The mixture was heated to 165° C. and stirred at 150 rpm under a nitrogen inert atmosphere. The mixture was then heated to 196° C. over 4 h and maintained at 197-202° C. for an additional 2 h, after which the product was discharged into a tared container. The water by-product (51 g) was collected through the distillation receiver. The product was recrystallized from isopropanol to yield a white product with a sharp melting point at 107° C. as measured by DSC.

Rheological analysis of this material was measured over a temperature range starting at 130° C. and cooling down to 60° C. using a RFS3 Rheometrics instrument (oscillation frequency of 1 Hz, 25 mm parallel plate geometry, 200 applied strain %). The melt viscosity at 130° C. was 3 cPs, and the onset of crystallization of this material occurred at 107° C., with a peak viscosity of $7.2 \times 10^6$ cPs.

EXAMPLE III

Preparation of Inks 1-3

Ink 1 was prepared as follows. Into a 30 mL glass vessel was charged, in the following order: 3.13 g 2-undecyl-5,5-bis (hydroxymethyl)-4H-oxazoline, prepared as described in Example I (62.5 wt %), 1.3 g penta-erythritol tetrabenzoate (obtained from Sigma-Aldrich; 26 wt %), 0.35 g of an α-pinene/β-pinene copolymer (PICCOLYTE F90, obtained from Pinova Solutions, GA; 7 wt %), and 0.1 g pentaerythritol tetrastearate (obtained from Sigma-Aldrich; 2 wt %). The materials were first melted together at 130° C. for 1 h, after which was added 0.13 g Orasol Blue GN dye (obtained from Ciba; 2.5 wt %) to the molten mixture. The colored ink mixture was heated at 130° C. while stirring at 300 rpm for an additional 2.5 h. The dark blue molten ink (Ink 1) was then poured into a mold and cooled at room temperature to solidify.

Ink 2 was prepared by the same process as Ink 1 except that 2.5 wt % Orasol Blue GN dye was replaced with the same amount of Solvent Yellow 146 Dye (commercially sold as Orasol Yellow 4GN, BASF, Germany). In addition, the amount of penta-erythritol tetrabenzoate was increased from 26 wt % to 28 wt. %, the amount of PICCOLYTE F90 was reduced from 7 wt % to 3.5 wt. %, and the amount of pentaerythritol tetrastearate was increased from 2 wt % to 3.5 wt. %.

Ink 3 was prepared by the same process as Ink 1 except that 2.5 wt % Orasol Blue GN dye was replaced with the same amount of Solvent Blue 36 Dye (obtained from Aakash Chemicals & Dyestuff Inc., Illinois). In addition, the amount of penta-erythritol tetrabenzoate was increased from 26 wt % to 28 wt. %, the amount of PICCOLYTE F90 was reduced from 7 wt % to 3.5 wt. %, and the amount of pentaerythritol tetrastearate was increased from 2 wt % to 3.5 wt. %.

Properties of the inks were then measured. For comparison purposes, the same properties were measured for the XEROX® PHASER® cyan solid ink. All ink viscosities were measured dynamically in centipoise units over a range of temperatures at constant 1 Hz frequency, using a Rheometrics RFS3 instrument equipped with a Peltier temperature-controlled unit, 25 mm parallel plate geometry tool, gap of 0.2 mm, and applied strain of about 200% (however the ink had strain-independent viscosities). The table below lists the viscosity data, thermal properties (melting temperature, onset crystallization temperature) and ink hardness data for Example Inks 1, 2 and 3, and also the Comparative Ink (XEROX® PHASER® cyan solid ink).

| Ink Properties | Ink 1 | Ink 2 | Ink 3 | Comparative Ink A |
|---|---|---|---|---|
| Jetting Viscosity (cPs) | 12.0 | 12.1 | 14.7 | ~10.5 (at 120° C.) |
| Peak Viscosity (cPs) | $5.75 \times 10^7$ | $5.70 \times 10^7$ | $4.1 \times 10^7$ | $7 \times 10^7$ |
| Tcryst (rheology) (° C.) | 91 | 91 | 104 | 88 |
| Tcryst (DSC) (° C.) | 55.5° C. | 56.7° C. | 82.6° C. | — |
| Tmelt (DSC) (° C.) | 93° C. | 93.5° C. | 105° C. | — |
| Ink Hardness | 82 | 80 | 80 | 67 |

— indicates not measured

The inks were printed onto XEROX® Digital Color Elite Gloss (DCEG) coated papers (120 gsm stock) using a K-proofer gravure printing apparatus (obtained from Testing Machines Incorporated, New Castle, Del., USA) equipped with a type B single wedge gravure plate having 150 lines/inch (60 lines/cm) and three 100%-80%-60% density zones on the plate. The gravure plate temperature was set at 142° C. (actual plate temperature ~135±1° C.) and the pressure roller set at low pressure. The K-proofer apparatus is a useful printing tool to screen a variety of inks at small scale and to assess image quality and/or coloristic properties on various substrates, before an ink formulation is scaled up and optimized for more in-depth printing tests.

As the data indicate, the inks disclosed herein exhibited desirable viscosities in the range of 9 to 15 centipoise at jetting temperatures of about 130° C. while also exhibiting very sharp crystallization at a moderate temperature in the range of 70-105° C. and having very high viscosities when the ink solidifies (>$10^7$ centipoise). The inks showed a good onset temperature for crystallization, broadly ranging between 70-105° C. and typically close to 90° C. It is desirable to have the onset temperature for ink crystallization be greater than 70° C. so as to control ink jettability as well as limiting the degree of ink penetration into paper and preventing excessive ink showthrough. The ink hardness data also shows that Inks 1 to 3 had average hardness values above 80, which were significantly harder than the Comparative Ink hardness value at 67. A high ink hardness value, in particular when above 75, is one indicator of ink robustness.

Image robustness of ink prints can be evaluated using a scratch (or abrasion) tester. Two different scratch tests were performed on the inks, which are the coin scratch test and the gouge finger test. The coin scratch test evaluates how much ink is removed from printed coating or image after a beveled-edge circular tool (referred to as the coin tip) is run across the surface. The instrument used for this test is a modified Taber Industries Linear Abraser (Model 5700) with a custom "coin" scratch tip weighing 100 grams, which, when lowered onto the test print sample, is then scratched across the print surface for either 3 cycles or 9 cycles at a frequency of 25 cycles/minute. A two inch long scratch is examined to characterize the amount of ink material removed from the print sample by first scanning along the scratch length using a flat bed scanner and then performing image analysis with software that counts the area of paper substrate that is visible compares it to the original amount of ink in the scratched area.

Another scratch test tool is called the gouge finger tester, which is a custom apparatus equipped with three separate sharp finger-like tips that are dragged across the ink print sample. Different force loads are applied to the three fingers, labelled as heavy, medium, and light force loads. The prints prepared with the inks of the Examples were scratch-tested using only the medium and heavy load gouge finger tools, as these are considered stress test conditions. For each gouge finger tip, a single scratch that runs down the length of the print sample was conducted at constant speed setting. The scratched area of the print sample was then examined to characterize the amount of ink or toner material removed from the print sample in the same manner as done for the coin scratch tester described above. Commercial image analysis software converted the pixel count to a unit-less measurement CA (crease area). White areas in the scratch zone (i.e. areas where ink has been removed from the substrate by the scratch tip) were counted. Higher pixel counts corresponded to more ink being removed from the print and showing more damage. A perfect non-scratched ink print would have no material being removed and therefore would have very low pixel count (and CA) approaching zero.

The data in the table below show the CA values (which are directly proportional to pixel count) for the scratched areas of the K-proof ink prints generated by both the coin and gouge-finger testers. While there is inevitably some variation in the data due to threshold limits of the image analysis for the scratch areas, the relative CA data shown for three example inks and the comparative ink clearly indicate that the three Example inks, prepared of polyterpene and oxazoline components, all demonstrated significantly better scratch resistance than the Comparative ink (XEROX® PHASER cyan ink):

| Ink | Test # | Coin Scratch 3 cycles | Coin Scratch 9 cycles | Gouge-Finger (Medium Load) | Gouge-Finger (Heavy Load) |
|---|---|---|---|---|---|
| Comparative Ink A | 1 | 62.33 | 113.46 | 158 | 311 |
|  | 2 | 57.74 | 85.58 | — | — |
|  | Avg | 60.04 | 99.52 | — | — |
| Ink 1 | 1 | 6.11 | 21.17 | 18.4 | 43.84 |
|  | 2 | 4.54 | 16.01 | — | — |
|  | Avg | 5.33 | 18.59 | — | — |
| Ink 2 | 1 | 8.74 | 22.14 | 22.41 | 84.07 |
|  | 2 | 12.07 | 17.37 | — | — |
|  | Avg | 10.40 | 19.76 | — | — |
| Ink 3 | 1 | 40.9 | 40.59 | 22.02 | 131.59 |
|  | 2 | 23.81 | 53.52 | — | — |
|  | Avg | 32.36 | 47.06 | — | — |

— = not measured

Furthermore, Inks 1 and 2 showed the best scratch-resistance performance among the tested inks, while all three Example inks had 2-fold to 6-fold improvement in the coin scratch test, and a 3-fold to 7-fold improvement in the gouge-finger scratch test, over Comparative Ink A.

Other embodiments and modifications of the present invention may occur to those of ordinary skill in the art subsequent to a review of the information presented herein; these embodiments and modifications, as well as equivalents thereof, are also included within the scope of this invention.

The recited order of processing elements or sequences, or the use of numbers, letters, or other designations therefor, is not intended to limit a claimed process to any order except as specified in the claim itself.

What is claimed is:

1. A phase change ink comprising:
   (a) a crystalline oxazoline compound which is

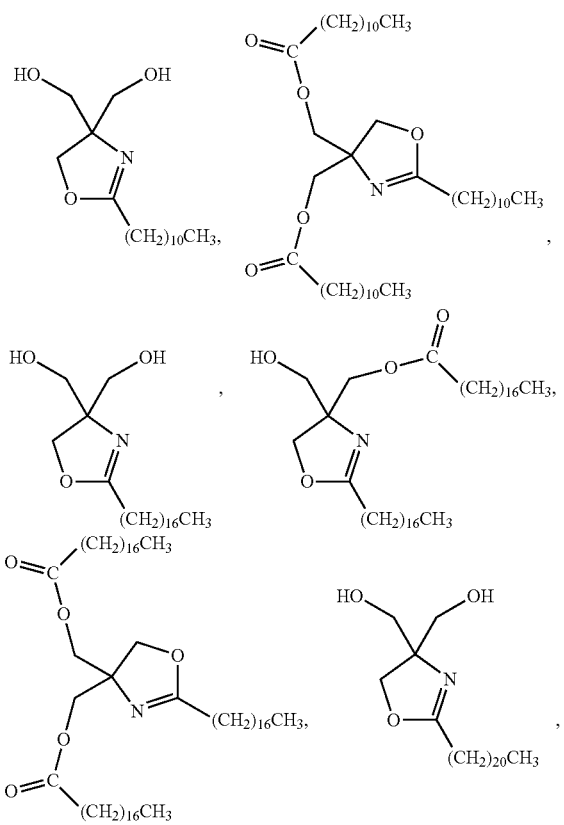

or mixtures thereof; and (b) an amorphous polyterpene resin.

2. An ink according to claim 1 wherein the oxazoline compound is present in the ink in an amount of from about 10 to about 90 percent by weight of the ink.

3. An ink according to claim 1 wherein the polyterpene resin is an α-pinene/β-pinene copolymer, a β-pinene polymer, a limonene polymer, or a mixture thereof.

4. An ink according to claim 1 wherein the polyterpene resin is present in the ink in an amount of from about 5 to about 50 percent by weight of the ink.

5. An ink according to claim 1 further containing a viscosity modifier.

6. A phase change ink comprising:

(a) a crystalline oxazoline compound;

(b) an amorphous polyterpene resin; and a viscosity modifier which is a sorbitan tristearate ester, a pentaerythritol tetrastearate, a pentaerythritol tetrabenzoate, or a mixture thereof.

7. An ink according to claim 1 wherein the colorant is a pigment.

8. An ink according to claim 1 wherein the colorant is a dye.

9. An ink according to claim 6 having a hardness value of at least about 70 as measured at about 25° C.

10. An ink according to claim 1 having a peak melting point, as measured by DSC, of from about 60 to about 120° C.

11. An ink according to claim 6 wherein the oxazoline compound is of the formula

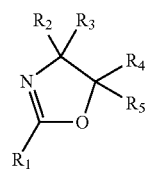

wherein:

$R_1$ is:

(1) an alkyl group, wherein hetero atoms either may or may not be present in the alkyl group;

(2) an aryl group, wherein hetero atoms either may or may not be present in the aryl group;

(3) an arylalkyl group, wherein hetero atoms either may or may not be present in either or both of the alkyl portion and the aryl portion of the arylalkyl group; or (4) an alkylaryl group, wherein hetero atoms either may or may not be present in either or both of the alkyl portion and the aryl portion of the alkylaryl group; and R2, $R_3$, $R_4$, and $R_5$ each, independently of the other, are:

(1) hydrogen atoms;

(2) halogen atoms;

(3) alkyl groups, including substituted and unsubstituted alkyl groups, wherein hetero atoms either may or may not be present in the alkyl group;

(4) aryl groups, including substituted and unsubstituted aryl groups, wherein hetero atoms either may or may not be present in the aryl group;

(5) arylalkyl groups, including substituted and unsubstituted arylalkyl groups, wherein hetero atoms either may or may not be present in either or both of the alkyl portion and the aryl portion of the arylalkyl group; or (6) alkylaryl groups, including substituted and unsubstituted alkylaryl groups, wherein hetero atoms either may or may not be present in either or both of the alkyl portion and the aryl portion of the alkylaryl group, wherein the substituents on $R_2$, $R_3$, $R_4$, and $R_5$, when present, are hydroxy groups, ester groups, ketone groups, or alkoxy groups.

12. An ink according to claim 6 wherein the polyterpene resin contains monomers selected from the group consisting of alpha-pinene, beta-pinene, limonene, norbornene, myrcene, phellandrene, carvone, camphene, 2-carene, 3-carene, perillyl alcohol, perillyl aldehyde, perillic acid, alkyl esters of perillyl alcohol, aryl esters of perillyl alcohol, arylalkyl esters of perillyl alcohol, alkylaryl esters of perillyl alcohol, α-ionone, β-ionone, γ-terpinene, β-citronellene, β-citronellol, citronellal, citronellic acid, alkyl esters of β-citronellol, aryl esters of β-citronellol, arylalkyl esters of β-citronellol, alkylaryl esters of β-citronellol, geraniol, geranial, alkyl esters of geraniol, aryl esters of geraniol, arylalkyl esters of geraniol, alkylaryl esters of geraniol, linalool, alkyl esters of linalool, aryl esters of linalool, arylalkyl esters of linalool, alkylaryl esters of linalool, nerolidol, alkyl esters of nerolidol, aryl esters of nerolidol, arylalkyl esters of nerolidol, alkylaryl esters of nerolidol, verbenol, verbenone, alkyl esters of verbenol, aryl esters of verbenol, arylalkyl esters of verbenol, alkylaryl esters of verbenol, and mixtures thereof.

13. An ink according to claim 5 wherein the viscosity modifier is a sorbitol ester, a pentaerythritol ester, or a mixture thereof.

14. An ink according to claim 1 wherein the polyterpene resin contains monomers selected from the group consisting of alpha-pinene, beta-pinene, limonene, norbornene, myrcene, phellandrene, carvone, camphene, 2-carene, 3-carene, perillyl alcohol, perillyl aldehyde, perillic acid, alkyl esters of perillyl alcohol, aryl esters of perillyl alcohol, arylalkyl esters of perillyl alcohol, alkylaryl esters of perillyl alcohol, α-ionone, β-ionone, γ-terpinene, β-citronellene, β-citronellol, citronellal, citronellic acid, alkyl esters of β-citronellol, aryl esters of β-citronellol, arylalkyl esters of β-citronellol, alkylaryl esters of β-citronellol, geraniol, geranial, alkyl esters of geraniol, aryl esters of geraniol, arylalkyl esters of geraniol, alkylaryl esters of geraniol, linalool, alkyl esters of linalool, aryl esters of linalool, arylalkyl esters of linalool, alkylaryl esters of linalool, nerolidol, alkyl esters of nerolidol, aryl esters of nerolidol, arylalkyl esters of nerolidol, alkylaryl esters of nerolidol, verbenol, verbenone, alkyl esters of verbenol, aryl esters of verbenol, arylalkyl esters of verbenol, alkylaryl esters of verbenol, and mixtures thereof.

15. An ink according to claim 1 having a hardness value of at least about 70 as measured at about 25° C.

16. An ink according to claim 6 wherein the colorant is a pigment.

17. An ink according to claim 6 wherein the colorant is a dye.

* * * * *